(12) United States Patent
Filice et al.

(10) Patent No.: US 6,213,488 B1
(45) Date of Patent: Apr. 10, 2001

(54) EXPOSED CARBON CORE BICYCLE SEAT POST AND METHOD OF MANUFACTURE THEREOF

(75) Inventors: Gary W. Filice; Charles R. Teixeira, both of Van Nuys, CA (US)

(73) Assignee: Jas. D. Easton, Inc., Van Nuys, CA (US)

( * ) Notice: Subject to any disclaimer, the term of this patent is extended or adjusted under 35 U.S.C. 154(b) by 0 days.

(21) Appl. No.: 09/203,234

(22) Filed: Dec. 1, 1998

Related U.S. Application Data

(60) Provisional application No. 60/069,827, filed on Dec. 16, 1997.

(51) Int. Cl.[7] .................................................. B62K 1/00
(52) U.S. Cl. .............................. 280/281.1; 280/288.4; 297/195.1; 297/215.16
(58) Field of Search ........................ 280/281.1, 288.4; 428/634, 616, 621, 626; 29/523, 508, 507, 447, 448; 297/195.1, 215.16, 215.14

(56) References Cited

U.S. PATENT DOCUMENTS

| | | | |
|---|---|---|---|
| 4,613,187 | * 9/1986 | Gordon | ...................... 297/195 |
| 4,826,192 | * 5/1989 | Borromeo | ...................... 280/281.1 |
| 5,364,095 | 11/1994 | Easton et al. | . |
| 5,695,241 | * 12/1997 | Olsen et al. | .................. 297/215.14 |
| 5,979,978 | * 11/1999 | Olsen et al. | .................. 297/215.15 |

* cited by examiner

*Primary Examiner*—Anne Marie Boehler
(74) *Attorney, Agent, or Firm*—Roth & Goldman

(57) ABSTRACT

A light weight high strength bicycle seat post comprised of a metal tube having a pre-stressed, tubular composite core therein, with the core having an exposed end extending from the tube, and method making same are disclosed in which the tube includes a composite core compressively engaged with the interior of the metal tube. The composite core is compressively restrained inside the metal tube by compressive stresses in the order of not less than about twenty thousand pounds per square inch. The composite core is formed of a plurality of layers of carbon fibers in a triaxial arrangement. The method of making the bicycle seat post consists of inserting an uncured composite core into a metal tube and expanding the core into engagement with the metal tube under heat and pressure to cure the composite and establish a light weight high strength bicycle seat post. Accordingly, the article is particularly useful as a bicycle seat post that possess strength, rigidity, and light weight.

6 Claims, 1 Drawing Sheet

EXPOSED CARBON CORE BICYCLE SEAT POST AND METHOD OF MANUFACTURE THEREOF

CROSS REFERENCE TO RELATED APPLICATIONS, IF ANY

The present application hereby claims the benefit of U.S. provisional application Ser. No. 60/069,827 filed Dec. 16, 1997.

BACKGROUND OF THE INVENTION AND PRIOR ART

1. Field of the Invention

The present invention relates to the manufacture of high performance bicycle components and, more specifically, to lightweight, high strength seat posts.

2. Prior Art

High performance cycling requires a frame and other components of a bicycle to possess strength, rigidity, and light weight. As is well known, tubular bicycle frames and seat posts are ordinarily made of metal or metal alloys such as steel, aluminum, or titanium. High strength composites such as carbon or fiberglass reinforced cured resins are also useful for high strength tubular structural parts. Bicycle seat posts that are manufactured from composite materials are subject to damage since clamping of an end of a bicycle seat post into a less than ideally prepared frame structure can quickly destroy the structural integrity of composites through gouging, fretting and point loading. For the same reason, a bicycle seat assembly cannot be clamped to the upper end of a seat post manufactured of composites.

Since most high performance bicycles now employ a high performance seat-receiving head to which the seat is clamped, a new seat post is desired which combines the best features of metals and composites.

OBJECTS OF THE INVENTION

The primary objective of the present invention is to provide a high strength light weight bicycle seat post having a tubular metal end to be received in and clamped to a bicycle frame and an exposed composite end to which a high performance bicycle seat-receiving head can be permanently attached.

It is a further object of the present invention to provide a bicycle seat post having an exposed carbon composite core of outside diameter which is less than the outside diameter of the metal end of the seat post which is designed to be received in the bicycle frame so that the exposed composite end cannot inadvertently be clamped in the bicycle frame.

It is a further object of the present invention to provide a method of manufacture of bicycle seat posts of the foregoing type.

SUMMARY OF THE INVENTION

The present invention accordingly provides a bicycle seat post comprising:
a) a metal tube;
b) a tubular composite core having a first portion compressively restrained in said metal tube and a second portion projecting from one end thereof, said core having an end adapted to receive a bicycle seat head.

The present invention further provides a method of manufacturing a bicycle seat post comprising the steps of:
a) forming a metal tube;
b) inserting an uncured composite core having a length greater than the length of said tube into said metal tube;
c) placing an exposed end of said core into a mold having an inside shape sized to produce said post; and
d) expanding said core into engagement with the inside of said metal tube and said mold under heat and pressure sufficient to cure said core and affix said core in said tube with substantial compressive stress between said core and said tube.

DESCRIPTION OF THE PREFERRED EMBODIMENT

Bicycle seat posts according to the present invention are produced by starting from a standard stock tubular aluminum alloy, preferably of the 7XXX Series, which is first drawn to an outside diameter slightly larger than the intended outside diameter of the finished product. For example and without limitation, a tubular aluminum stock may be drawn to form a seat post tube 10 having an outside diameter of approximately 27.2 millimeters and a wall thickness of approximately 0.032" for manufacture of a finished post having a 27 mm outside diameter with 0.029" wall thickness or 26.8 mm with a wall thickness of 0.025".

Figure 1:
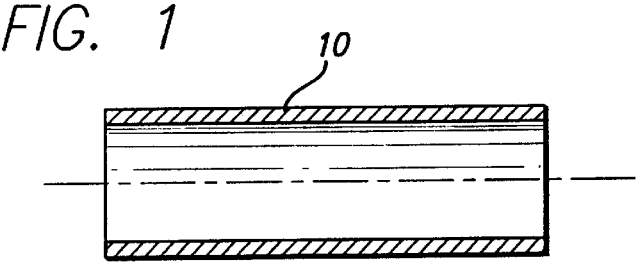
FIG. 1 is a side cross-section of a drawn metal seat post tube formed to have a correct final inside diameter and an oversized outside diameter.
Figure 2:
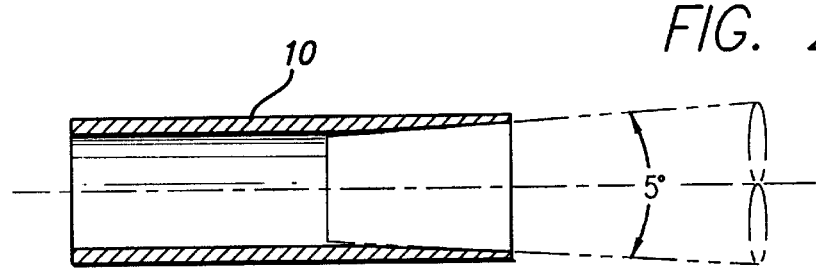
FIG. 2 is a side cross-section like FIG. 1 but showing one end portion of the tube after taper reaming of the inside wall thereof.
Figure 3:
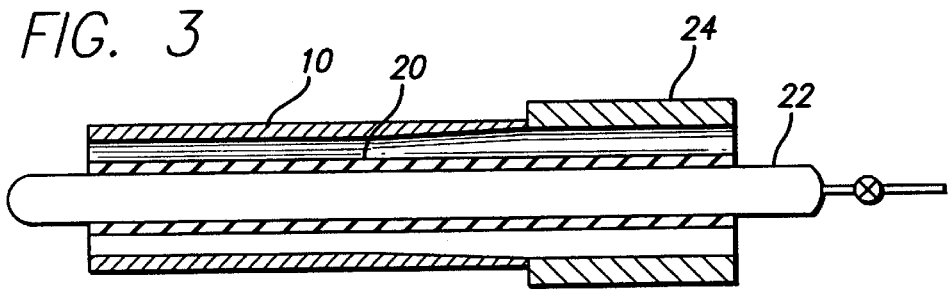
FIG. 3 is a side cross-section like FIG. 2 showing the tube and a mold for forming an exposed end of a composite core lay-up wrapped around an inflatable tubular mandrel inserted into the metal tube and mold prior to expansion of the composite core into engagement with the inside wall of the tube and the mold.
Figure 4:
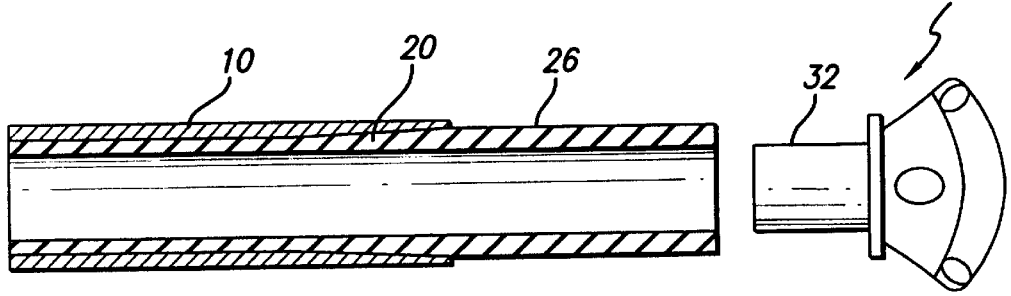
FIG. 4 is a side cross-section of the seat post showing the tube and composite core extending internally of the tube and outwardly from one end of the tube for reception of a seat post head.
Figure 5:
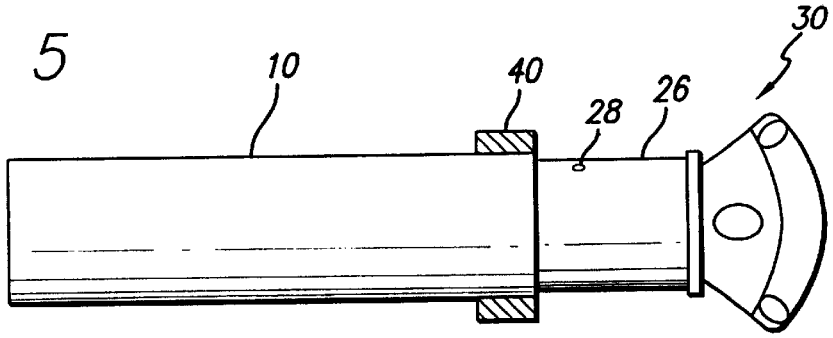
FIG. 5 is a side view of the finished seat post with assembled head and an optional collar externally affixed to the metal tube.

The drawn oversized tube is then taper reamed at one end to provide a smooth tapering inside diameter for minimizing stress concentrations at the transition location where a carbon fiber reinforced resin composite core 20 extends from the tube. The taper reaming is preferably performed using a rotary reamer having a taper angle of about 5 degrees. As seen in FIG. 5, the composite core 20 has an exposed portion 26 which projects from one end of the metal tube 10. The reamer is inserted into the tube 10 for a distance sufficient to form a taper length adequate to relieve stress concentrations along the location where the carbon fiber reinforced resin composite core 20 extends from the tube. Following the taper reaming, the metal tube 10 is first prepped by chemically cleaning the metal tube which is made preferably of aluminum or aluminum alloy to remove metal oxides. Next, the tube is primed by applying any one of well known water based primer bonding agents which chemically interlock with the composite core and contain metal molecules which bond the core to the metal tube.

A soft preferably triaxially arranged carbon fiber reinforced resin lay-up is formed into a tube and then placed onto an inflatable elongated tubular mandrel 22 which is in turn inserted into the prepped and primed alloy tube 10 such that the mandrel and lay-up thereon extends inside the full length of the tube 10 and has a further exposed length of about ⅓ and preferably not less than about 10% of the length of the finished seat post. For example, a finished post having a total length of 380 mm may have an aluminum alloy tube length of about 253 mm and an exposed composite length of about 127 mm. The tube 10 and mandrel 22 with exposed lay-up 20 thereon are then inserted into a mold 24 following which the mandrel is pressure expanded and the tube 10 and composite 20 are heated to a temperature suitable for curing the fiber reinforced resin composite which is allowed to cure before the assembly is removed from the mold. The mold 24 is preferably designed with a cavity size in order to insure that the exposed portion 26 of the carbon reinforced composite 20 has an outside diameter which is less than or greater than the finished outside diameter (e.g. 27.0 mm) of the aluminum tube 10 in order to prevent inadvertent clamping of the exposed portion 26 of composite 20 into a bicycle frame.

The molded seat post is then machined to finish the metal tube to smaller desired final sizes, for example an outside diameter of 26.8 or 27.0 millimeters. The final steps of anodizing the exposed metal surface of the seat tube and silkscreening product logos and identifiers onto the post then take place.

The finished post may, if desired, also be assembled as a unit with a high performance head 30 having a male end 32 which is received in and bonded to the exposed composite end portion 26 of the tubular seat post or head 30 may instead be molded as an integral part of the exposed composite portion 26 of the post.

Without limitation and by way of example only, mandrel inflation pressures in the range of 150–200 psi coupled with a composite curing temperature of approximately 250° F. which is held for a period of time of approximately 45–60 minutes is suitable for most applications. The resulting layered bicycle seat post has a composite core 20 which is pre-stressed inside of the metal tube 10 to substantial compressive stress between the core 20 and the tube 10 of as much or more than pressures of the order of 20,000 psi. This pre-stressing is the result of expansion of the metal tube during the heating and bonding of the composite core therein followed by resultant heat shrinkage of the metal tube over the core as the assembly is allowed to cool from curing temperature to ambient temperature. See the disclosure of U.S. Pat. No. 5,364,095 which is incorporated herein by reference.

The soft composite lay-up which forms core 20 preferably comprises a resin pre-preg having triaxially arranged carbon reinforcement fibers 28 in proportions of approximately 37–42% of the lay-up. The resulting seat post has a unique combination of high strength, torsional and bending stiffness close to that of all-metal posts, low weight, and damage tolerance at the exposed metal end which is clamped into the bicycle frame. The anisotropic properties of the carbon reinforcing fibers 28 of composite core 20 may be uniquely utilized for directional structural rigidity of the exposed composite end of the seat post which, in its finished condition, has an exposed composite length of about one third and a metal covered length of about two thirds of the seat post. If desired, an insertion stop ring 40 can be bonded to the outer surface of the metal tube 10 to limit the length to which the metal tube can be inserted into the bicycle frame. This insures that the new post will never be inadvertently inserted too far so as to protect the exposed composite end 20 from damage due to inadvertent clamping.

Persons skilled in the art will appreciate that various modifications can be made including, but not limited to, directionally reinforcing the post by use of oval or other non-circular tube cross-sections, and/or tapering or otherwise varying the diameter or wall thickness of either or both of the metal and composite portions of the tube.

What is claimed is:

1. A bicycle seat post comprising:

a) a metal tube;

b) a tubular composite core having a first portion compressively restrained in said metal tube and a second portion projecting from one end thereof, said core having an end adapted to receive a bicycle seat head, said core being compressively restrained inside said metal tube by compressive stresses in the order of not less than twenty thousand pounds per square inch between the inside wall of said metal tube and the outer wall of said core.

2. The bicycle seat post of claim 1, wherein said core comprises a carbon fiber reinforced resin.

3. The bicycle seat post of claim 2, wherein said core comprises a triaxial carbon fiber composite.

4. A bicycle seat post comprising:

a) a metal tube;

b) a tubular composite core having a first portion compressively restrained in said metal tube and a second portion projecting from one end thereof, said core having an end adapted to receive a bicycle seat head, said metal tube having a constant outside diameter along at least part of its length and said metal tube is internally reamed at the end from which said core projects and said projecting end of said core has a constant outside diameter less than said constant outside diameter of said metal tube.

5. The bicycle seat post of claim 4, wherein said metal tube is taper reamed at an angle of about five degrees for a length sufficient to adequately reduce stress concentrations.

6. The bicycle seat post of claim 5, wherein said metal tube comprises aluminum or aluminum alloy.

* * * * *